United States Patent [19]

Thurston

[11] 4,292,529

[45] Sep. 29, 1981

[54] MISFEED DETECTOR

[75] Inventor: Thomas R. Thurston, Boulder, Colo.

[73] Assignee: International Business Machines Corporation, Armonk, N.Y.

[21] Appl. No.: 24,756

[22] Filed: Mar. 28, 1979

[51] Int. Cl.[3] .............................. G01N 21/86

[52] U.S. Cl. .............................. 250/561

[58] Field of Search .............................. 250/548, 561; 226/45

[56] References Cited

U.S. PATENT DOCUMENTS 3,684,890 8/1972 Hayne et al. .

3,832,065 8/1974 Sullivan et al. .

3,948,170 4/1976 Ericsson .

*Primary Examiner*—David C. Nelms

*Assistant Examiner*—Darwin R. Hostetter

*Attorney, Agent, or Firm*—Homer L. Knearl

[57] ABSTRACT

A clamp for holding paper on a paper drum contains an aperture which may be optically scanned to detect the presence of paper in the clamp. The clamp is placed near the corner or edge of the document so that the registration of the paper will be known. A single detector scans the aperture as the registration clamp moves relative to the detector and looks for a dark-light-dark sequence of video signals to verify that paper is properly positioned in the clamp.

30 Claims, 6 Drawing Figures

MISFEED DETECTOR

FIELD OF THE INVENTION

This invention relates in general to the proper handling of a sheet of material and in particular to detecting the proper registration of a sheet of material to be printed upon.

BACKGROUND ART

Paper jams are a common occurrence in sheet-fed xerographic copiers, facsimile machines, printing presses, and the like. In addition to mechanical disruption and potential damage to the apparatus, a paper jam often causes the image-transfer medium, e.g., xerographic toner or printing ink, to be applied to a roller or support element where it adversely affects subsequent copying or printing.

It is, therefore, advantageous to develop a system that will detect incipient and potential misfeeding of sheet material before an actual mechanical jam has occurred, and which will cooperate with other elements of the process to provide a signal indicating such a problem or actually inhibiting further operation.

One solution to this problem is described in U.S. Pat. No. 3,684,890, which covers a photocell misfeed detector system described in operation with a xerographic copying machine. In this system, a photolamp directs two beams of light through fiber optic means to reflect off the surface supporting the sheet material and off the gripper member gripping the paper being fed thereon. If a sheet of material is properly fed to the surface supporting the sheet material, the beam of light striking the gripper finger and the beam striking the paper produce unequal reflective values to thereby indicate a sheet is properly clamped. If the two beams of light are reflected in a substantially equal or balanced condition, a misfeed or unclamped sheet is indicated and a control signal is produced to effect a discontinuance of the operation of the particular machine utilizing the sheet.

It is possible, however, for this prior art system to indicate a properly fed sheet when, in fact, the sheet may be skewed, i.e., not in proper registration on the drum, or not actually gripped by the plurality of clamps required to properly hold the sheet on the drum. For example, the sheet may be skewed or adjacent to the clamp but not under the clamp. A further disadvantage of this system is that it requires three photocells per detection mechanism (or per clamp), two for paper sensing in the area of the clamp and one to determine whether the light source is operating.

SUMMARY OF THE INVENTION

The object of this invention is to more reliably detect the proper registration of a sheet of material to a transport device.

In accordance with this invention, the above object has been accomplished by optically detecting through a narrow window the changes in reflectivity which occur due to relative motion of the reflecting surface(s) and the sensing window. A narrow aperture in the upper portion of a sheet-gripping mechanism (clamp) is illuminated by a light-source-and-detector assembly which determines by means of a thresholding circuit whether the light reflected during a timed interval is from the clamp or other support component or from the sheet material. Two transitions between levels of reflected energy indicate that sheet material is properly located on the support surface under the aperture in the upper clamp member.

The misfeed detector provided by this invention can be used to detect the presence of a sheet of paper or other material such as that being fed to an ink jet printing drum, a xerographic photoconductor drum, or the like. A detection system might include a plurality of misfeed detectors, each detector having an illumination-source and photosensor assembly to direct a beam of light upon an aperture in a clamp member which is intended to grip the sheet material.

If a sheet of material is properly fed and clamped and the proper sequence of reflective signals is detected, both from the leading edge and from the trailing edge of the sheet, the machine continues its normal sequence of operations. However, if a sequence of reflective values indicates that a sheet is not properly engaged by any one of the clamp mechanisms, a misfeed situation is indicated and a signal is provided to halt rotation of the printing drum or motion of the support surface and prevent further damage to the apparatus.

Not only does the misfeed detection apparatus of this invention provide an indication of adequate clamping of sheet-fed material, but it also provides an indication of the proper positioning or registration of said material.

DESCRIPTION OF THE INVENTION

Figure 1:
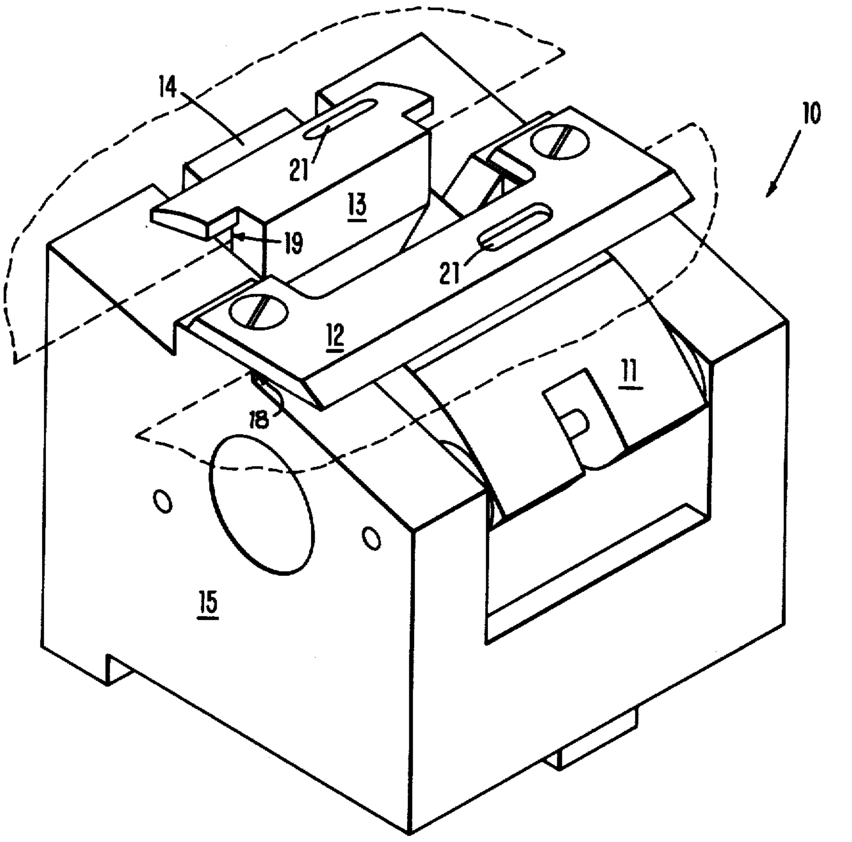
FIG. 1 is a close-up view of a clamp assembly containing both the leading-edge and the trailing-edge clamp mechanisms and showing the aperture in each.

Mechanism 10 (FIG. 1) includes spring-loaded clamp finger 11 and stationary registration plate and clamp bar 12, making up the leading-edge clamp, and spring-loaded registration plate and clamp finger 13 and clamp surface 14, making up the trailing-edge clamp, all mounted in support structure 15. Nine such registration and clamping structures 15 are mounted with mutually aligned registration surfaces 18 and 19 across the width of printing drum 16 (FIG. 2). The fingers 11 are rotatably mounted and operated by a cam, not shown. In coordination with the rotation of the drum, the clamp fingers 11 are pivoted toward the interior of the drum to receive sheet 17 between members 11 and 12 butted against registration edge 18 (FIG. 1), which is defined by the junction of mutually aligned clamp bars 12 and frame elements 15 affixed to printing drum 16. Clamp fingers 11 then pivot outward to exert a radial force against the inserted sheet, pressing it firmly against stationary members 12 in order to carry sheet 17 along with the rotation of the drum. During the first revolution of the drum, outer spring-loaded members 13 of the trailing-edge clamps are rotated open by apparatus not shown. The paper leaves the external feed mechanism and is held flush with the surface of the drum by pressure rolls 20. After the trailing edge of sheet 17 enters the trailing-edge clamps, clamp members 13 return to the closed position, now overlapping the trailing edge of the paper and pressing it firmly against inner clamp surfaces 14.

Figure 2:
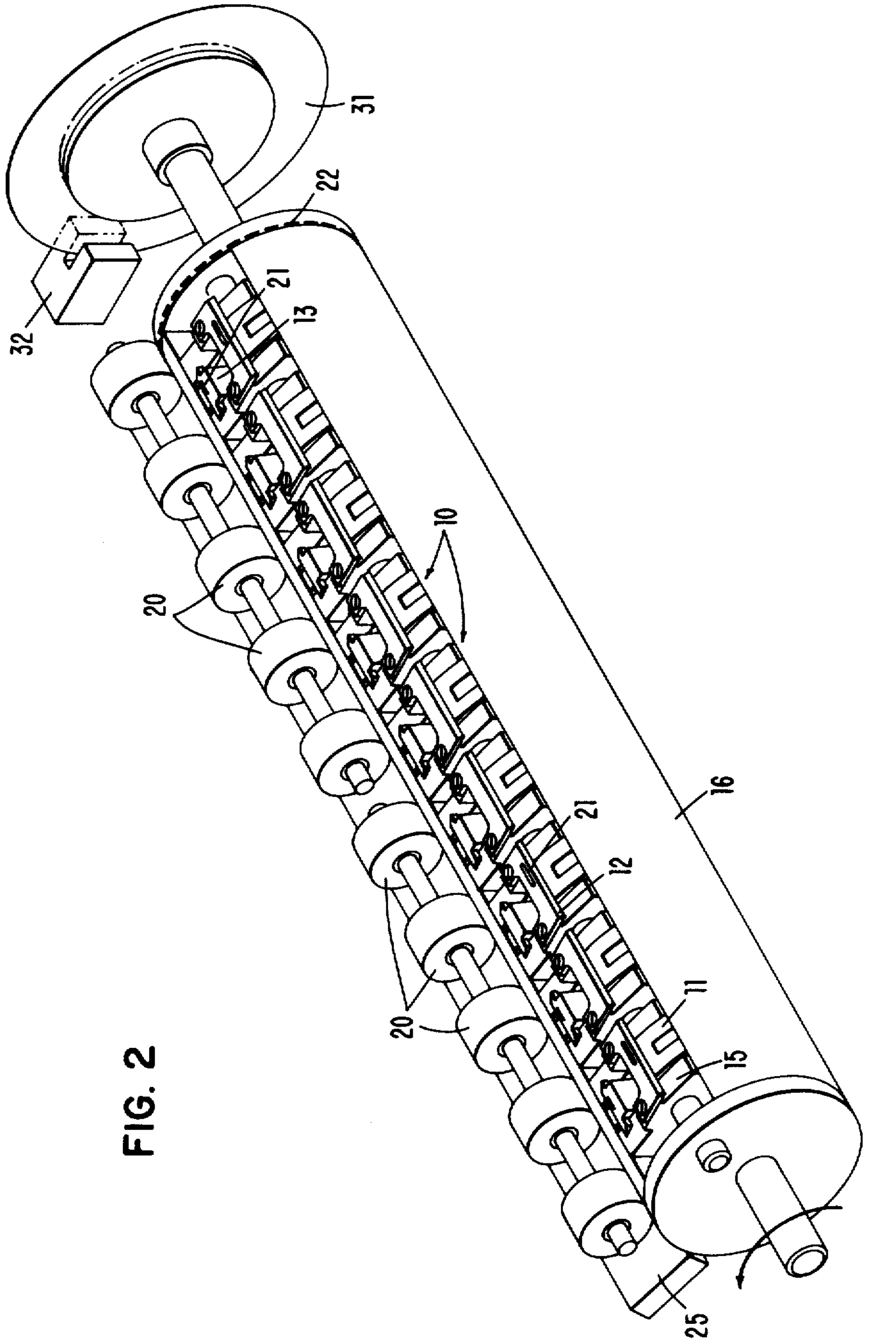
FIG. 2 is a view of nine clamp assemblies aligned on a printing drum.

At least two registration plates 12 of the leading-edge clamp mechanisms and the corresponding two members 13 of the trailing-edge clamp mechanisms have an elongated, slot-like aperture 21 aligned parallel to registration surfaces 18 and 19 (FIG. 1). When sheet-fed material is properly aligned with registration surfaces 18 and 19 and with reference position 22 (shown by a dashed line in FIG. 2) and is properly gripped by clamp mechanisms 10, it is visible through these slots or apertures 21. For multiple-sheet-size adaptability of the misfeed detection apparatus and simplicity of manufacture of the clamp assemblies 10, all clamp members 12 and 13 can have an aperture 21. The size of these apertures and their placement relative to the reference edges are determined by the acceptable range of paper widths and lengths, by the tolerance that is acceptable in registering the paper for printing, and by the minimum area required for the paper for printing, and by the minimum area required for optical resolution of "light" areas. In the embodiment shown, the apertures are approximately 1 mm wide and 6 mm long.

The apertures in the first, seventh, and ninth clamps, numbered from the right in FIG. 2, are used to detect the presence (or absence) of two common sizes of paper, 216 mm×279 mm (8.5 in.×11 in.) and 216 mm×356 mm (8.5 in.×14 in.). Obviously, the registration plates and apertures and drum can be adapted to any desired size of sheet material.

Figure 3A:
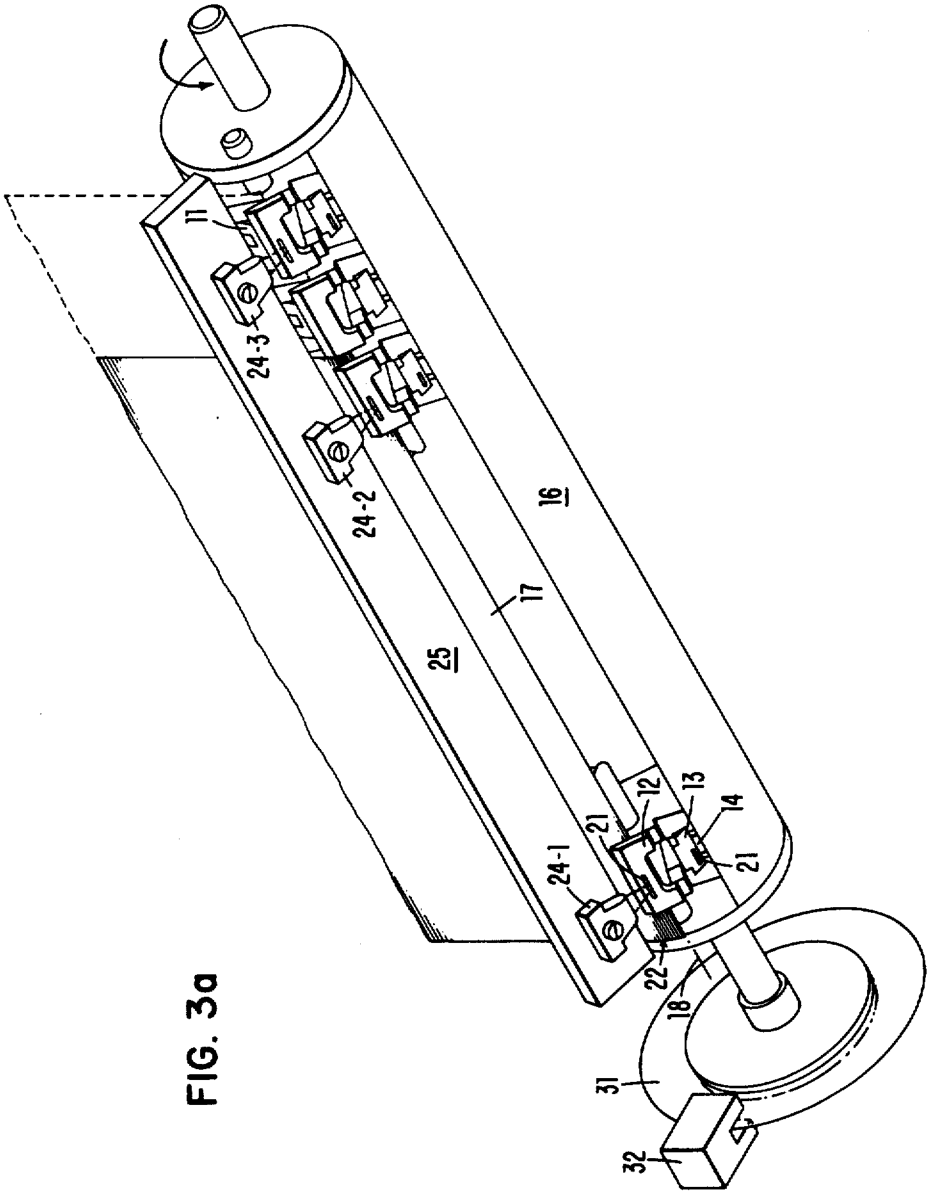
FIG. 3*a* shows three illuminator-detector housings in position over a row of clamp assemblies. Two sizes of sheets are shown held in position by the leading-edge clamps.
Figure 3B:
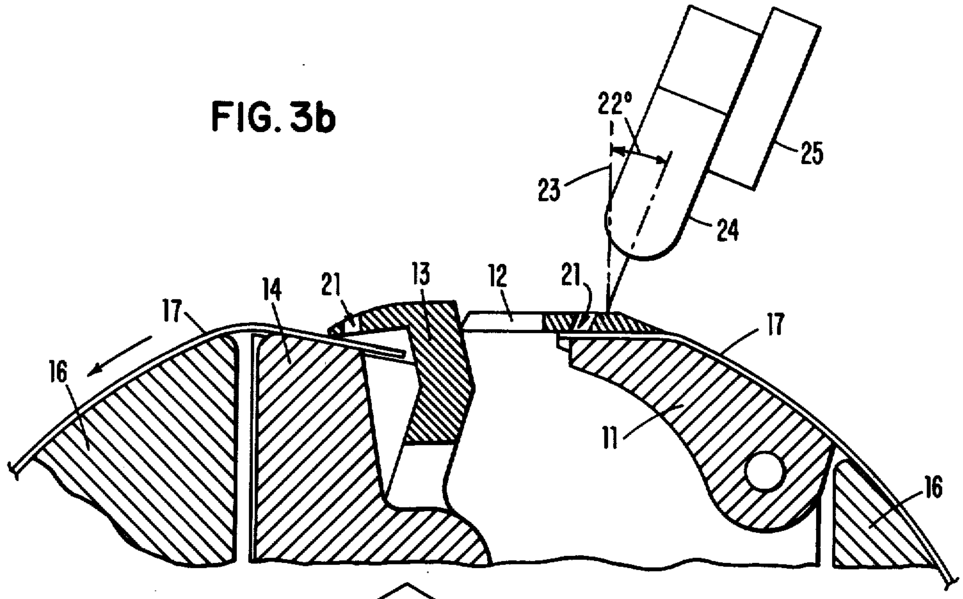
FIG. 3*b* is a side (drum-end) view of a source-detector housing and a cross-sectional view of clamp assembly.

In FIG. 3*a*, three source-detector housings 24 are mounted on machine frame 25 in close proximity to printing drum 16 and are positioned across the width of the drum so that an aperture 21 passes directly underneath each housing 24 during rotation of the drum. The common principle midplane of these housings intersects the top surface of the clamp bar 12 at an angle of approximately 22 degrees from the normal to the surface. (FIG. 3*b* shows a cross-section through the slots 21 of a clamp assembly.) Aperture slots or light transmissive channels 21 are cut through clamp members 12 and 13 also at an angle of approximately 22 degrees from normal 23 to the drum surface. The canted orientation of the source-detector housings thus matches that of the slots or channels in the clamp mechanisms. The size of the common angle, here 22 degrees, as well as other parameters in the optical components, may be varied to optimize signal levels.

Figure 4:
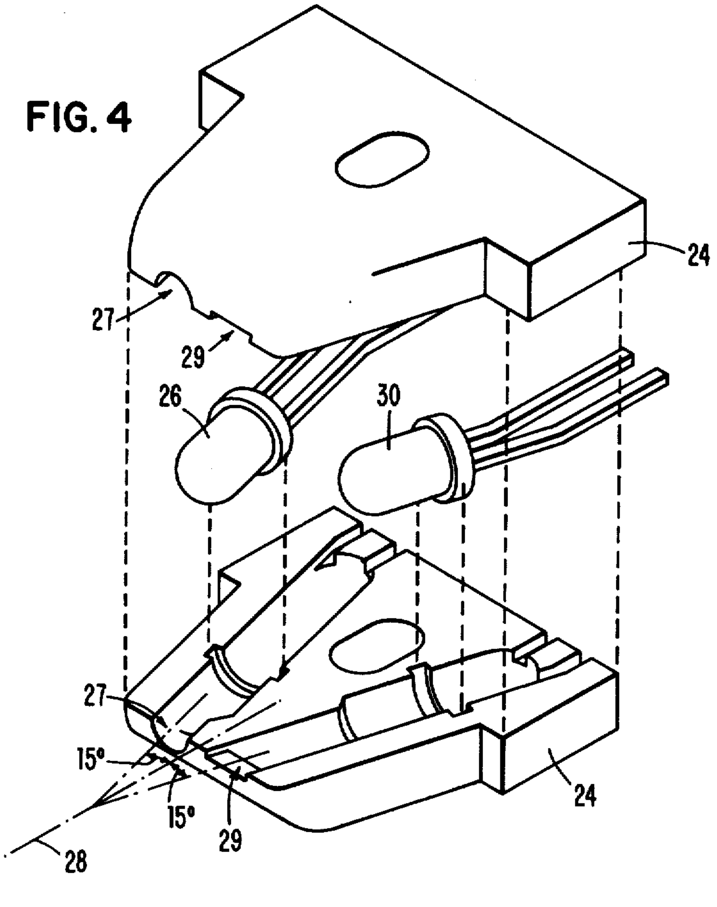
FIG. 4 is an exploded view of a source-detector housing.

Source-detector housing 24 is illustrated in FIG. 4. Within the housing is a light source, for example, light-emitting diode (LED) 26, which is coupled by suitable electrical connectors (not shown) to the power supply and control circuit of the machine. Light from source 26 in illuminator-detector housings 24 is directed onto the surfaces of slotted clamp members 12 and 13 through cylindrical channel 27 so that in the proper sequence, after sheet material has been fed into the clamp mechanisms, each slot 21 is broadly illuminated. Light channel 27 for the source is canted at an angle of about 15 degrees (which may be varied) from centerline 28 of illuminator-detector housing 24 (FIG. 4).

Figure 5:
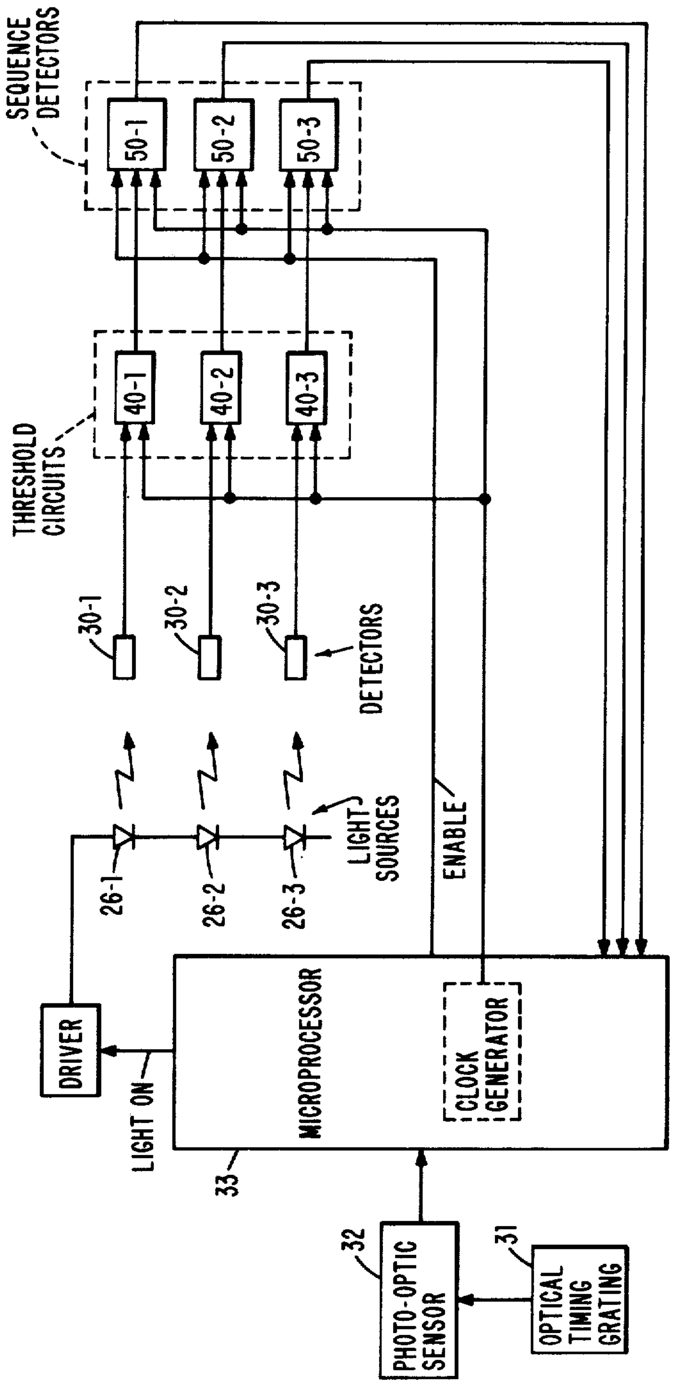
FIG. 5 is a schematic diagram of the misfeed detection system for the reflected-light signals.

Also within the housing, occupying separate lightpath channel 29, and with independent electrical connections (not shown) to the power supply and control circuit, is light-detecting phototransistor 30. Element 30 is responsive to the level of light reflected from the vicinity of aperture 21 in the clamp. The cooperation of the photodetector with the control circuit of the machine to indicate misfeed detection is described later in conjunction with the logic circuit in FIG. 5. Detector channel 29 is canted at the same angle (15 degrees) but on the opposite side of housing centerline 28 from light-source channel 27 (see FIG. 4*a*). The cross section of detector channel 29 is similar to that of aperture 21, but it is smaller to reduce the effect of stray light and to provide adequate resolution to "see" and distinguish between narrow black (clamp) and white (aperture) regions.

Sheet material 17 properly gripped by a plurality of clamp machanisms 10 is shown in FIG. 3*a*. In this example, two common sizes of printing material are shown, i.e., 8.5 in.×11 in. and 8.5 in.×14 in. (dashed line), whereby there is a minimum of two misfeed or clamp-fault detection apparatuses 24 for each size sheet located near the leading-edge corners of each sheet and, similarly, there are at least two detectors 24 at the trailing-edge corners. Both clamp members 11 and 14 underneath the sheet material and clamp members 12 and 13 above it have a highly reflective, specular, black finish, whereas the sheet material has an essentially white, diffusely reflecting surface.

When photodetector 30 is looking either directly at upper clamp surface 12 or 13 or at lower clamp surface 11 or 14 through slot 21 in the former, the reflected signal level is clearly established as "black" (low) because the specular black surface finish reflects essentially all of the incident light away from detector housing 24 at an angle of 22 degrees on the opposite side of the surface normal 23 from the housing (angle of incidence equals angle of reflection; see FIG. 3*b*). When sheet material 17 with essentially diffuse white surface finish of at least a minimal reflectance (e.g., 70 percent at a wavelength of 900 nanometers, the maximum sensitivity point of the photodetector) is properly engaged between upper (12 or 13) and lower clamp elements (11 or 14), the lower black surface is masked by paper 17 and photodetector 30 senses a "white" reflected signal level through aperture 21.

As printing drum 16 is rotated, and with an LED 26 turned on, a black-white-black or low-high-low sequence of photosignals from detector 30 in the same housing 24 indicates that a sheet of printing material 17 is properly registered and gripped by a particular clamp mechanism 10 on the printing drum. A black-white or low-high signal sequence (white-black for the trailing-edge clamp) or a white-only set of signals from a detector indicates that the sheet material is misplaced above upper clamp surface 12 (or 13), and black-only signals indicate that the sheet material is altogether missing from the clamp area. Each of these latter cases causes a misfeed signal to be generated which results in cancellation of the print cycle. The black-white-black or low-high-low sequence of signals must be obtained concurrently from two or more (depending on sheet size) leading-edge clamps 12 and, after an appropriate delay, concurrently from two or more trailing-edge clamps 13. Only if all the proper sets of concurrent and consecutive signals are obtained is the print cycle allowed to continue.

Operation

Referring now to FIGS. 2, 3, 4 and 5, position signals for all machine operations are taken from optical grating 31 on the printing drum axis (FIG. 2). Photo-optic sensor 32 sends signals to microprocessor 33 (FIG. 5) as an indication of drum position, and microprocessor 33, incorporating a clock generator, turns all electromagnetic and electro-optic devices on and off in the proper sequence. Misfeed or clamp-fault detection by sequence detectors 50 (FIG. 5) interrupts the machine operation and commands a shutdown.

In FIG. 2, drum 16 is in the load position. After a sheet of printing material 17 is fed to clamp mechanisms 10, the drum rotates as indicated. Referring now to FIG. 3*a*, as viewing apertures 21 in clamp members 12 approach source-detector housings 24-1, 24-2, and 24-3, LEDs 26 are turned on (26-1, 26-2, and 26-3 in FIG. 5), and a timed position-sensing window is initiated for the establishment of a properly fed or a misfeed condition. Three detectors, 30-1, 30-2, and 30-3 in FIG. 5 (30 in FIG. 4*a*) provide signals indicating the light reflected from the leading-edge clamp mechanisms. These signals may be coded 0, for example, by the threshold circuits 40-1, 40-2, and 40-3 in FIG. 5 if the detector sees black—less than a fixed threshold signal strength—or 1 if the detector sees white—an above-threshold signal strength. The three sets of signals are synchronized by the drum-grating timing ciruit. (When short sheet material is used, the third set of sensors is checked to make sure no paper is there.)

To monitor or analyze black and white levels of reflected light, the threshold circuits 40-1, 40-2, and 40-3 sample the voltage output from photodetector 30 at 200-microsecond intervals and compare it with a preset threshold level. When the output level is greater than the threshold level, a binary one is generated indicating the presence of paper during one timing interval. To reduce the effect of noise and spurious responses, sequence detectors 50 look for three consecutive binary ones to actually identify a white level condition.

When the output level from photodetector 30 is less than the threshold level in the threshold circuits 40, a binary signal is generated indicating the absence of paper during one 200 μs time interval. The sequence detectors 50 look for three consecutive binary zeros before they actually identify a black level condition.

The sequence detectors 50 are enabled by the microprocessor 33 for a 20 ms timing interval (one-hundred, 200 μs intervals). The microprocessor 33 generates this enable signal at the time that the light beam from the light source is scanning across the registration plate and the aperture therein. When enabled, each of the sequence detectors 50 first looks for three consecutive binary zeros. When this condition is satisfied, the sequence detectors then begin looking for three consecutive binary ones. The three consecutive binary ones need not be immediately adjacent to the three consecutive binary zeros. If both of these conditions are satisfied, the sequence detectors then begin looking again for three binary zeros which again need not be immediately adjacent the three binary ones. If all three of these conditions are satisfied during the 20 ms window, i.e., while the light beam is scanning across the clamping mechanism, the sequence detector satisfying the conditions will have an output signal indicating paper is present and registered. Microprocessor 33 monitors the outputs from sequence detectors 50-1, 50-2, and 50-3. If each sequence detector indicates the proper sequence of reflected signal levels has been detected, then microprocessor 33 will indicate the sheet has been properly registered and machine operation continues.

If at the end of the position sensing window this black-white-black sequence has not been detected, the detector circuit indicates a misfeed situation and the printing drum is stopped. If a light source fails, only black will be sensed; the black-white-black sequence cannot be detected and the machine is similarly stopped.

If the sheet material is properly clamped and registered at the leading edge, the drum continues to rotate, bringing the trailing-edge registration plate under the illuminator-detector housings. The sensing window procedure and reflected signal analysis are repeated. If the black-white-black sequence is again detected, indicating proper clamping of the trailing edge of the sheet material, the drum speed is increased for printing. Otherwise, a shutdown sequence is initiated.

As alternatives to this fixed threshold method of discriminating between high and low reflected-light levels, dynamic threshold methods may be used. In one such analog method, the comparator (threshold) voltage follows the increase of the light signal voltage at a fractional level. When the phototransistor output voltage falls below this comparator reference level, the signal is identified as "black," and a rise above this level will be identified as "white."

In one digital dynamic threshold method, the light source is ramped-on in sawtooth fashion during the timing intervals. For each interval a pulse-counter state is stored when the phototransistor output reaches a certain level or the detector switches. When consecutive counter states are significantly different, indicating that surface reflectance has changed significantly, the presence of paper is indicated.

Also the detector channel might be repositioned to respond to specular reflection instead of diffuse reflection. In this event, the sequence of reflected energy levels indicating proper registration would be high-low-high. Of course, there would still be two transitions between reflected energy levels.

Whereas I have illustrated and described the preferred embodiment of my invention, it is to be understood that I do not limit myself to the precise constructions herein disclosed and the right is reserved to all changes and modifications coming within the scope of the inventiion as defined in the appended claims.

I claim:

1. Apparatus for sensing registration of a sheet comprising:

a registration plate having a reference edge at which the sheet may be registered and an aperture through which the presence of the sheet adjacent the reference edge may be detected;

means for scanning across said registration plate and across the aperture therein, said scanning means sensing no transition or one transition in the scan signal when the sheet is not under the aperture and sensing two transitions when the sheet is registered under the aperture.

2. The apparatus of claim 1 wherein said registration plate is part of a sheet-gripping mechanism having one or more movable parts.

3. The apparatus of claim 1 or 2 wherein said registration plate has a highly reflective, i.e., specular, black surface finish thereby substantially reducing diffuse reflection from its surface.

4. The apparatus of claim 1 or 2 wherein said scanning means is fixed and said registration plate and sheet move past said scanning means.

5. The apparatus of claim 1 wherein said scanning means includes a light source and a light detector having converging light channels.

6. The apparatus of claim 5 wherein the converging light channels are inclined at an angle relative to said registration plate to prevent light specularly reflected from said plate from entering the detector channel.

7. The apparatus of claim 5 wherein the aperture has its walls through said registration plate at an acute angle from the normal to the surface of the plate and the converging light channels are inclined at substantially the same angle to prevent light specularly reflected from the plate from entering the detector channel.

8. Apparatus for sensing registration of a sheet comprising:

a sheet-gripping mechanism having a fixed registration member and a movable gripping member, said registration member having a reference edge at which the sheet may be registered and having an aperture through which the presence of the sheet at the reference edge may be detected;

means for scanning a light beam across the registration member;

a light detecting means for sensing light reflected from the registration member and light reflected through the aperture in the registration member;

logic means for analyzing the sequence of signals from said detecting means to determine if the sheet is positioned under the aperture in the registration member.

9. The apparatus of claim 8 wherein said scanning means comprises:

a housing containing a light source for illuminating the registration member, said housing containing a channel for directing a light beam at the aperture in the registration member.

10. The apparatus of claim 8 and in addition:

means for enabling said logic means only when said scanning means is scanning across the registration member and the aperture.

11. The apparatus of claim 9 wherein said detecting means is incorporated into said housing, said housing having converging light channels, the source channel converging with a detector channel for the detecting means.

12. The apparatus of claim 11 wherein the converging light channels are inclined at an angle relative to the registration member to prevent light specularly reflected from said member from entering the detector channel.

13. The apparatus of claim 11 wherein said aperture forms a light transmissive channel through the registration member at an acute angle from the normal to the surface of said member and the converging light channels in said housing are inclined at substantially the same angle thereby preventing light specularly reflected from said member from entering the detector channel.

14. Detection system for sensing the registration of a sheet comprising:

a plurality of registration plates at which an edge of the sheet may be registered and each plate having an aperture through which the presence of the sheet may be detected;

a plurality of scanning means, each scanning means for scanning across a registration plate and across the aperture therein, each scanning means sensing no transition or one transition in the scan signal from an aperture when the sheet is not under the aperture and sensing two transitions when the sheet is registered under the aperture;

means for monitoring the transitions in the scan signals from the plurality of scanning means to determine if the sheet is registered.

15. The detection system of claim 14 and in addition:

means for enabling said monitoring means to monitor the scan signals when said scanning means is scanning across a registration plate and across the aperture therein.

16. The detection system of claim 14 wherein said monitoring means comprises:

a plurality of sequence detecting means, each sequence detecting means being responsive to one of said scanning means, detecting the sequence of transitions sensed by its scanning means and indicating the sheet is registered in its registration plate if two transitions are detected.

17. The detection system of claim 16 and in addition:

means for enabling each of said sequence detecting means to detect the sequence of transitions when its scanning means is scanning across a registration plate and across the aperture therein.

18. The detection system of claim 14 and in addition:

a second plurality of registration plates at which a second edge of the sheet may be registered and each having an aperture through which the presence of the sheet may be detected;

each of said scanning means scanning across a registration plate at the first edge and a registration plate at the second edge of the sheet;

means for enabling said monitoring means to monitor the scan signals when said scanning means is scanning across the registration plates at the first and second edges of the sheet.

19. Detection system for sensing the registration of a sheet comprising:

a plurality of registration plates each containing a mutually aligned portion at which a first edge of the sheet may be registered and each having an aperture through which the presence of the sheet may be detected;

a second plurality of mutually aligned registration plates each containing a portion of a common reference edge at which a second edge of the sheet may be registered and each having an aperture through which the presence of the sheet may be detected;

means for scanning across each registration plate and across the apertures therein, said scanning means sensing no transition or one transition in the scan signal when the sheet is not under the aperture and sensing two transitions when the sheet is under the aperture;

means for monitoring the transitions in the scan signals from the plurality of scanning means to determine if the sheet is registered.

20. The detection system of claim 19 and in addition:

means for enabling said monitoring means to monitor the scan signals when said scanning means is scanning across a registration plate and across the aperture therein.

21. The detection system of claim 19 wherein said monitoring means comprises:

a plurality of sequence detecting means, each sequence detecting means being responsive to one of said scanning means, detecting the sequence of transitions sensed by its scanning means and indicating the sheet is registered in its registration plate if two transitions are detected.

22. The detection system of claim 21 and in addition: means for enabling each of said sequence detecting means to detect the sequence of transitions when its scanning means is scanning across a registration plate and the aperture therein.

23. Method for sensing presence of a sheet under a plate with an aperture comprising the steps of:

scanning across the aperture and the plate;

sensing no transition or one transition i· the scan signal when the sheet is not under the aperture and sensing two transitions when the sheet is under the aperture.

24. The method of claim 23 wherein said scanning step comprises:

scanning a light beam across the aperture and the plate.

25. The method of claim 24 wherein said sensing step comprises the steps of:

detecting the light reflected from the plate;

detecting the light reflected through the aperture of the plate;

analyzing transitions in the reflected light to determine if the sheet is under the aperture.

26. Method of detecting the presence of a medium inside a member, where the medium diffusely reflects radiant energy and the member specularly reflects radiant energy and has a radiant energy transmissive channel to the medium receiving portion inside the member and said portion is also specularly reflective to radiant energy, comprising the steps of:

scanning across the member and the radiant energy transmissive channel through the member with a radiant energy beam;

sensing radiant energy reflected during said scanning step;

monitoring the level of sensed reflected energy;

detecting a sequence of three levels in sensed reflected energy when a medium is present in the member and one level or a sequence of two levels when a medium is not present in the member.

27. The method of claim 25 wherein said detecting step is performed only when said scanning means is scanning across the member and the radiant energy transmissive channel.

28. The method of claim 25 wherein said medium is a sheet and said member is a clamp for holding the edge of said sheet.

29. The method of claim 28 wherein said clamp includes a registration surface for said sheet in close proximity to the radiant energy transmissive channel whereby the detection of the sequence of three levels by said detecting step indicates the sheet is registered.

30. The method of claim 25 wherein said detecting step comprises detecting a low-high-low sequence of levels in sensed reflected energy when a medium is present in the member and a low level, a low-high sequence of levels, or a high-low sequence of levels when a medium is not present in the member.

* * * * *